INVENTOR.
DALE D. KLOSS
BY
Merchant, Merchant & Gould
ATTORNEYS

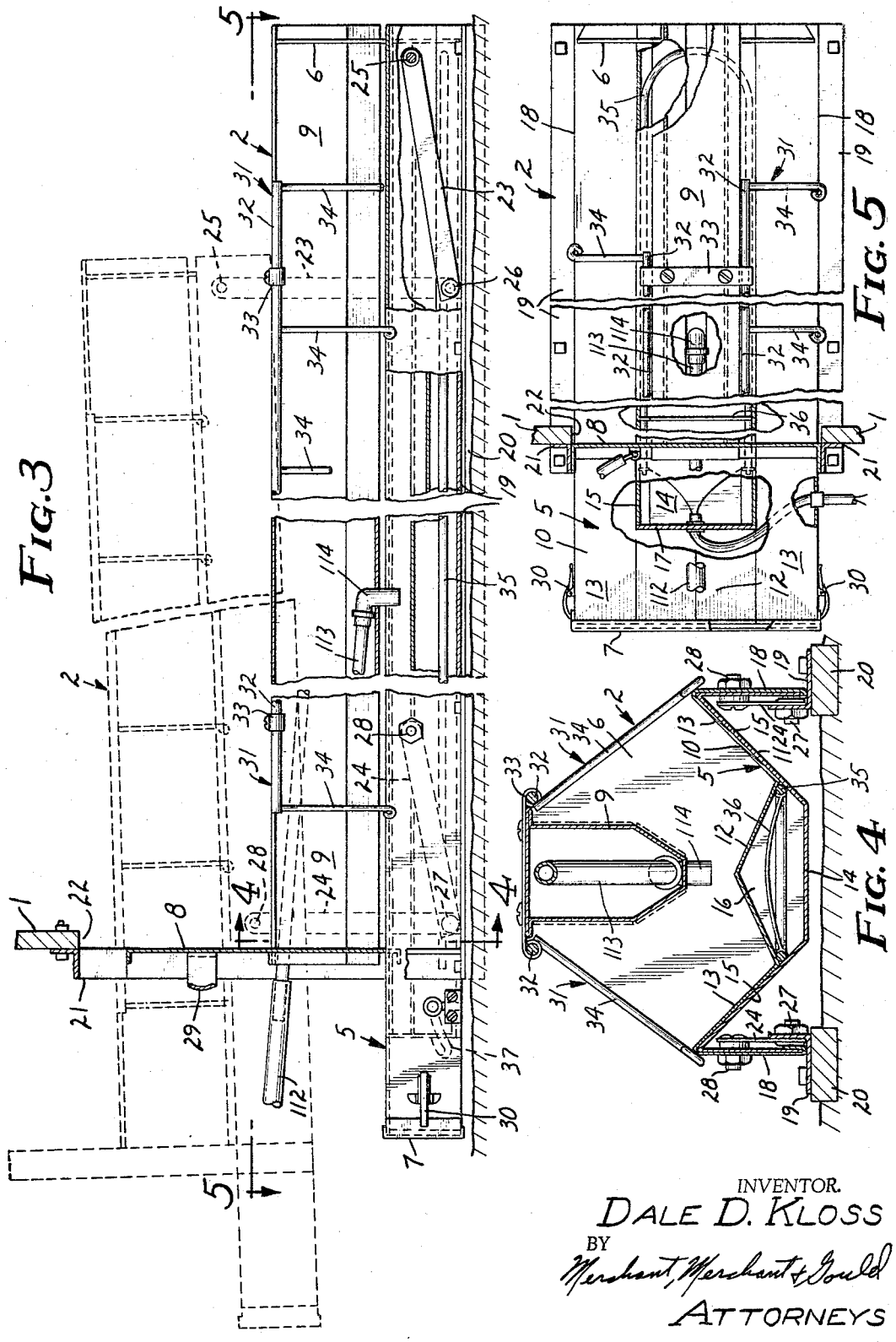

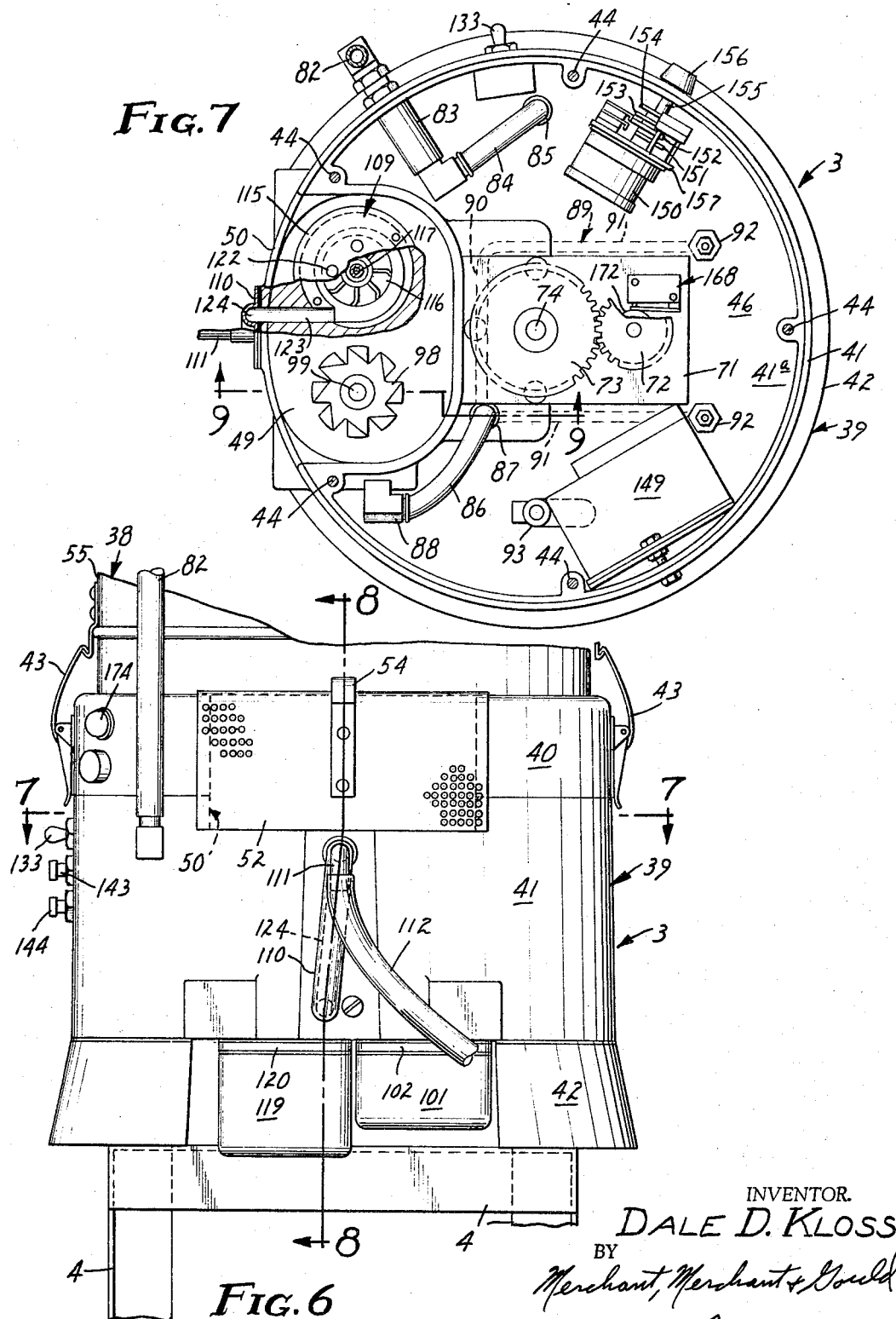

INVENTOR.
DALE D. KLOSS

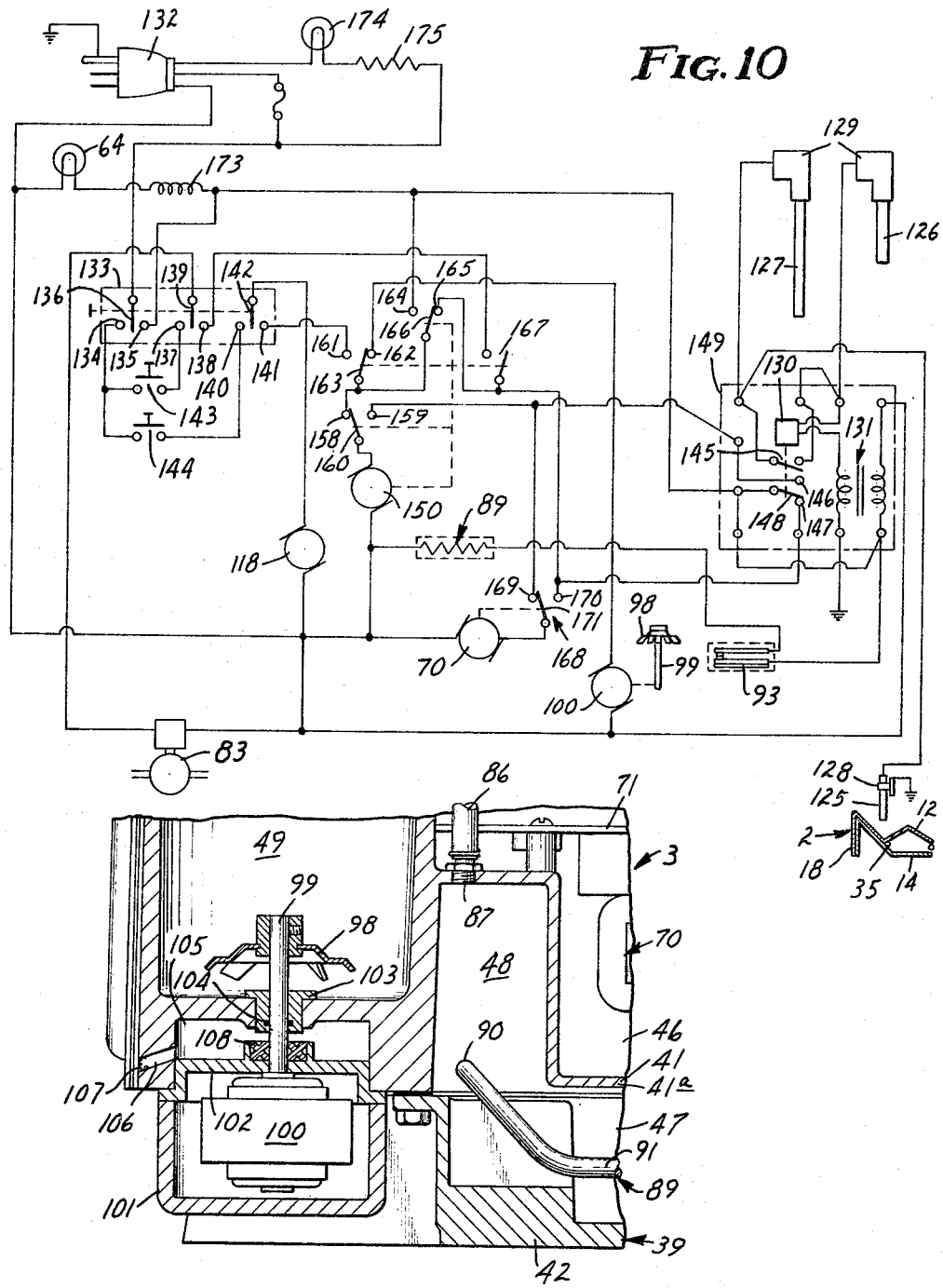

United States Patent Office 3,265,036
Patented August 9, 1966

3,265,036
ANIMAL LIQUID FEEDING APPARATUS
Dale D. Kloss, Minneapolis, Minn., assignor to K & K Manufacturing, Inc., Minneapolis, Minn., a corporation of Minnesota
Filed Sept. 3, 1964, Ser. No. 394,120
9 Claims. (Cl. 119—51)

My present invention relates generally to livestock feeding apparatus, and more particularly to devices for mixing dry food with liquid and presenting the mixed liquid food to young livestock for consumption thereby.

More specifically, my invention includes a novel feed trough and means for preparing liquid food, delivering the food to the feed trough and maintaining the supply of liquid food in the trough at a substantially constant level. The feed trough is adapted to extend through an opening in the wall or fence which defines an animal enclosure, close to the ground, the liquid food preparing means being disposed substantially above ground level and spaced an appreciable distance from the feed trough.

An important object of my invention is the provision of a feeder for small or young livestock, having a feed trough, means for supplying liquid animal food to the feed trough, and means for controlling the level of the liquid food in the trough.

Another object of my invention is the provision of a feed trough which may be quickly and easily drained and cleaned without muddying the adjacent portion of the animal enclosure.

Another object of my invention is the provision of a feed trough as set forth, having means for maintaining the liquid food therein at a desired temperature.

Still another object of my invention is the provision of a liquid food level control element in the feed trough and of barrier means for the prevention of contact between a feeding animal and the liquid level control element.

Another object of my invention is the provision of novel means for mounting the feed trough in an animal enclosure whereby the trough may be moved between a feeding position in close proximity to the ground and a raised cleaning position out of the reach of the feeding animals.

Yet another object of my invention is the provision of a liquid food mixing and dispensing device having means for mixing predetermined batches or quantities of liquid food and pumping means for delivering the mixed food to the feed trough in a positive manner.

Another object of my invention is the provision of a feed trough which is adapted to extend through a suitable opening in an animal enclosure wall, the trough having an outer end wall which is quickly and easily removed for draining the feed trough.

Another object of this invention is the provision of mounting means for the feed trough which, when the feed trough is moved to its raised cleaning position, automatically tilts the feed trough downwardly in a direction toward the removable end wall thereof.

Still another object of my invention is the provision of guard means on the feed trough for preventing a feeding animal from climbing into the trough, while permitting easy access to the liquid food therein.

To the above ends, I provide an elongated generally horizontal base structure that is adapted to rest upon the ground within an enclosure having a wall provided with an opening at its lower portion, with the longitudinal dimension of the base structure disposed at generally normal to the wall, the base structure including a generally vertically disposed generally rectangular open mounting frame at one end thereof adapted to be anchored to the enclosure wall about said opening, an elongated generally horizontal feed trough disposed in overlying generally parallel relation to the base structure, linkage mounting the feed trough on the base structure for angularly upward and downward movements relative to the base structure and generally longitudinally thereof between a lowered feeding position and a raised cleaning position, one end portion of the feed trough extending through the open frame and having a vertically extended transverse barrier disposed adjacent the frame when the feed trough is in its lowered feeding position, liquid food dispensing means removed from the feed trough for dispensing pre-determined quantities of liquid food, conduit means extending from the dispensing means to the feed trough, and control means for the dispensing means including a control element in the feed trough outwardly of the barrier and responsive to consumption of liquid food from the feed trough to a predetermined level to render said dispensing means operative to dispense a predetermined quantity of liquid food to said feed trough.

The above, and still further highly important objects and advantages of my invention will become apparent from the following detailed specification, appended claims and attached drawings.

Referring to the drawings, which illustrate the invention, and in which like reference characters indicate like parts throughout the several views:

FIG. 3 is an enlarged view corresponding to a portion of FIG. 1, some parts being broken away and some parts being shown in section;

FIG. 4 is an enlarged transverse section taken substantially on the line 4—4 of FIG. 3;

FIG. 5 is a fragmentary view in top plan as seen from the line 5—5 of FIG. 3, some parts being broken away and some parts being shown in section;

FIG. 6 is a fragmentary view in front elevation of the feed mixing and dispensing apparatus of my invention;

FIG. 7 is a transverse section taken substantially on the line 7—7 of FIG. 6 and rotated clockwise approximately 90°;

FIG. 9 is an enlarged fragmentary section taken substantially on the line 9—9 of FIG. 7; and FIG. 10 is a wiring diagram.

Figures 1, 2:
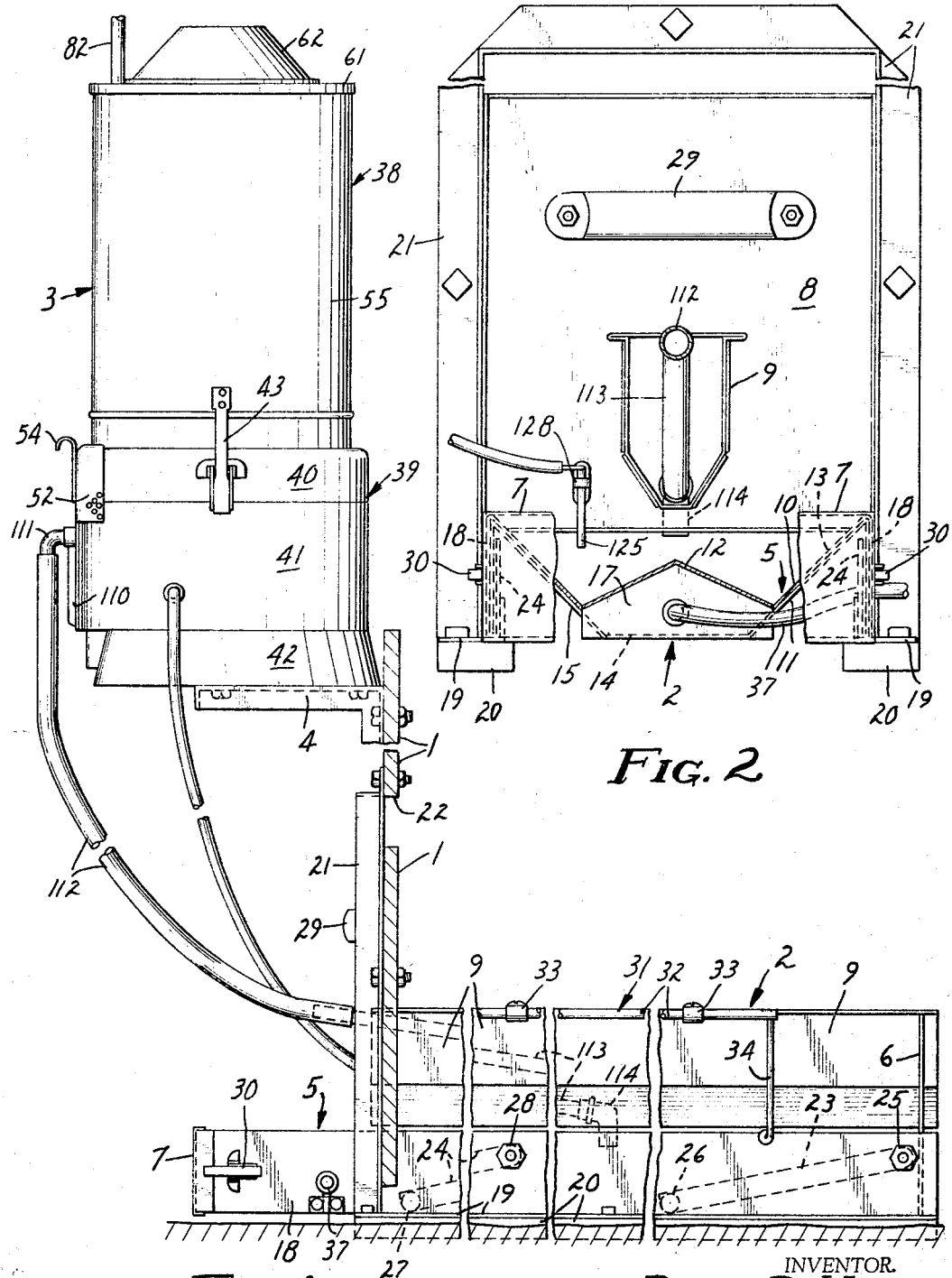
FIG. 1 is a view in side elevation of the animal liquid feeding apparatus of my invention, some parts being broken away.
FIG. 2 is an enlarged view in end elevation of the feeding trough of my invention, some parts being broken away.

Referring with greater detail to the drawing, and more particularly to FIG. 1, a portion of an enclosure wall is shown in cross section and indicated by the reference numeral 1. The wall 1 may be of any desired type, such as a board fence which defines an enclosure or pen for small young animals such as pigs or the like. As further shown in FIG. 1, the feeding apparatus of my invention involves an elongated feed trough, indicated generally at 2, that is disposed for the most part within the pen enclosed by the wall 1, and a liquid animal food mixer and dispenser 3 that is mounted on the enclosure wall or fence 1 by suitable means, such as a bracket or the like 4. It will be noted that the feed trough 2 is normally disposed substantially at ground level, whereas the liquid food mixer and dispenser 3 is supported by the bracket 4 remote from the feed trough 2 and appreciably above the level of the ground.

The feed trough 2 comprises bottom wall structure 5, inner and outer end walls 6 and 7 respectively, a transverse barrier wall 8 in relatively closely spaced relation to the outer end wall 7, and a vertically disposed hollow wall structure 9 overlying the bottom wall structure 5 and extending longitudinally of the feed trough 2 and rigidly connected at its opposite ends to the inner end wall 6 and the transverse barrier wall 8. The bottom wall structure 5 comprises upper and lower nested bottom wall sections 10 and 11 respectively, the former having a cross sectionally inverted V-shape central portion 12 and outwardly diverging outer portions 13, the latter having a cross-sectionally flat central portion 14 and laterally outwardly and upwardly sloping wall portions 15 that engage the overlying portion 13 of the wall section 10. The central portions 12 and 14 of the bottom wall sections 10 and 11 cooperate with the end wall 6 to provide a chamber 16 for a purpose which will hereinafter be described, the end of the chamber 16 opposite the end wall 6 being closed by a partition element 17 in inwardly spaced relation to the feed trough end wall 7. The laterally outer edge portions of the bottom wall sections 10 and 11 are downturned to provide depending flanges or side walls 18.

The feed trough 2 is mounted on a pair of laterally spaced parallel mounting members 19, preferably made from commercially available angle iron or the like and extending longitudinally adjacent the side walls 18 of the feed trough. The mounting members 19 are bolted or otherwise rigidly secured to underlying base members 20 shown by dotted lines in FIGS. 3 and 4 which are adapted to rest upon or be embedded in the ground within the enclosure defined by the wall or fence 1. At their outer ends, the mounting members 19 are welded or otherwise rigidly secured to a vertically disposed open transverse frame 21 that is adapted to be bolted or otherwise rigidly secured to the wall or fence 1 about an opening 22 therein, to dispose the mounting members 19 in positions generally normal to the plane of the adjacent portion of the wall or fence 1. The feed trough 2 is mounted on the mounting members 19 by means of mounting links 23 and 24 arranged in pairs, the pair of links 23 being pivotally secured to adjacent side walls 18, as indicated at 25, adjacent the inner end of the feed trough 2, and at their other ends to the mounting members 19, as indicated at 26. The links 24 are pivotally secured at one end each to an adjacent one of the mounting members 19 in closely longitudinally inwardly spaced relation to the frame 21, as indicated at 27, and at their other ends said links 24 are pivotally secured to the side walls 18, as indicated at 28. The pivotal connections 25–28 are parallel and extend horizontally transversely of the feed trough, the links 23 and 24 being generally horizontally disposed when the trough 2 is in its operative feeding position with the lower edges of the side walls 18 resting upon the mounting members 19. The feed trough 2, base members 19 and links 23 and 24 form a substantially parallelogram arrangement so that the feed trough 2 may be raised and moved longitudinally outwardly as shown by full and dotted lines in FIG. 3. The links 23 are slightly longer than the links 24, so that when the feed trough is moved upwardly to its dotted line position of FIG. 3, the same assumes a position wherein it slopes downwardly in the direction of the end wall 7. For the purpose of moving the feed trough 2 between its normal feeding position, shown by full lines in FIG. 3, and its upwardly and outwardly disposed cleaning position, shown by dotted lines in FIG. 3, I provide a handle 29 secured to the transverse barrier wall 8, see FIGS. 2 and 3.

It will be noted that, when the feed trough 2 is disposed in its normal feeding position, the outer end wall 7 is disposed outwardly of the wall or fence 1. The outer end wall 7 is releasably held against the adjacent end of the bottom wall structure 5 and side walls 18 by conventional clamping devices 30. Hence, when the feed trough 2 is moved to its upwardly and outwardly disposed cleaning position, shown by dotted lines in FIG. 3, and the removable end wall 7 removed, any liquid in the feed trough 2 will drain therefrom. It will be noted, with reference to FIG. 3, that when the feed trough 2 is in its normal feeding position, the barrier wall 8 is substantially coplanar with the open transverse frame 21.

A pair of guards 31 extend longitudinally of the feed trough 2 each thereof comprising an elongated shaft 32 pivotally mounted at an opposite side of the hollow vertical wall 9 by hinge brackets or the like 33, and a plurality of longitudinally spaced transverse bars 34 welded or otherwise secured at their inner ends to the shaft 32 and sloping outwardly and downwardly therefrom, the outer ends of the bars 34 normally resting on the upper edges of the side walls or flanges 18. The pivotal connections of the shafts 32 to the hinge brackets 33 enable the guards 31 to be swung upwardly away from engagement with the side walls 18 to permit unobstructed access to the interior of the feed trough for cleaning and the like. The transverse bars 34 are spaced apart sufficiently for entry therebetween of the head of a feeding animal. However, the openings or space between adjacent transverse bars 34 are not sufficiently large to enable an animal to climb into the feed trough and thus befoul the food therein.

An elongated generally U-shaped heating element 35 is disposed within the chamber 16 and extends for substantially the entire length thereof, opposite sides of the heating element 35 engaging the upper bottom wall 10 as shown in FIG. 4, and held in engagement therewith by one or more resilient retaining bars 36, see FIGS. 4 and 5. Electrical current is supplied to the heating element 35 from a suitable source thereof, not shown, through a conductor cable 37 that extends through one of the side walls 18 and partition 17, see particularly FIG. 5.

Figure 8:
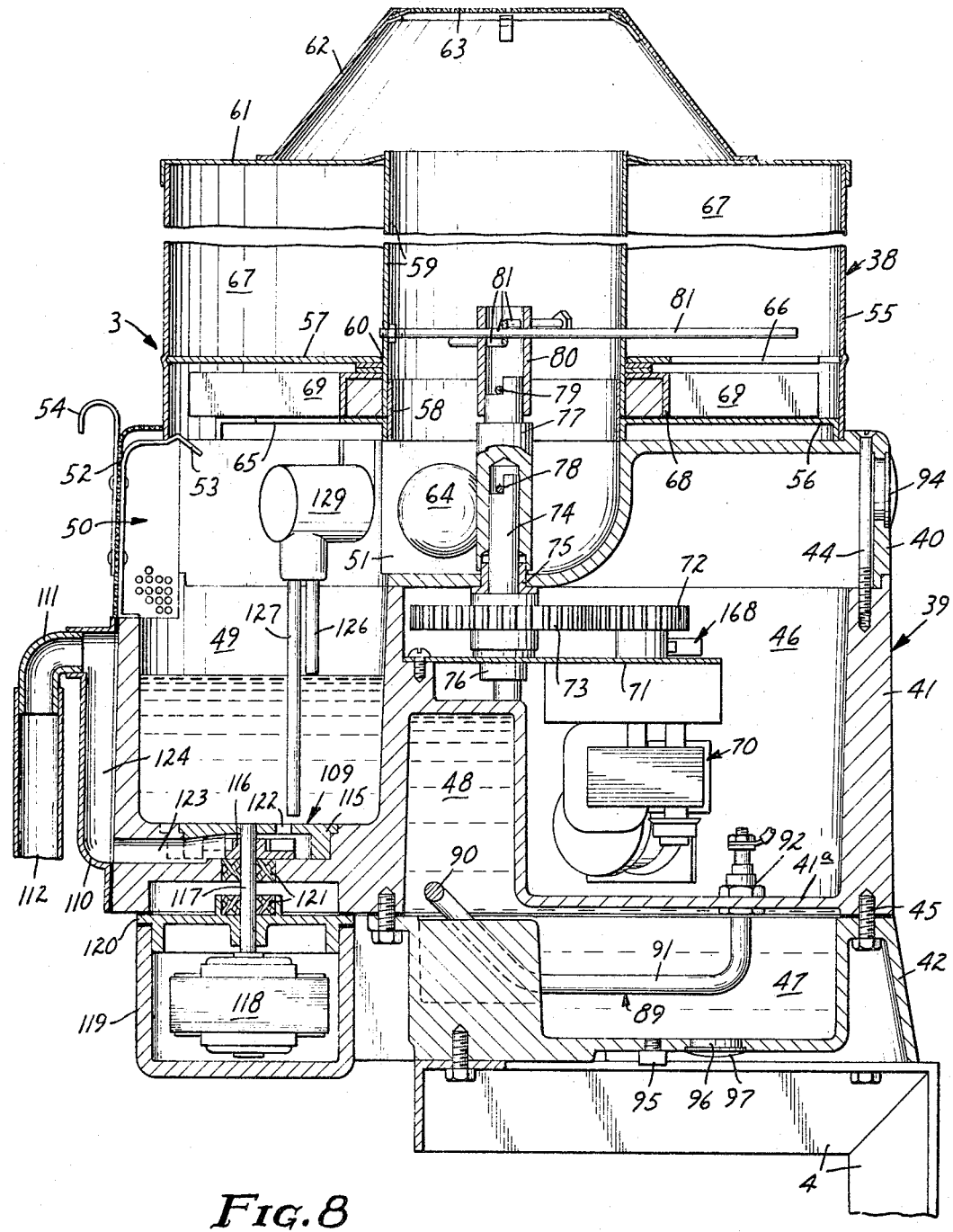
FIG. 8 is an enlarged fragmentary axial section taken substantially on the line 8—8 of FIG. 6.

The liquid animal food mixing and dispensing apparatus 3, shown in FIGS. 1 and 6–10, comprises a generally cylindrical dry food storage container 38, mounted on the upper end of a generally cylindrical base 39, which includes axially aligned upper, intermediate and lower base sections 40, 41 and 42, the container 38 being removably secured to the upper base section 40 by latching devices 43 of conventional structure. As shown in FIG. 8, the upper and intermediate base sections 40 and 41 respectively are rigidly secured together by machine screws or the like 44, the intermediate and lower base sections 41 and 42 being secured together by machine screws 45. The base sections 40 and 41 cooperate to define a motor chamber 46, the base sections 41 and 42 cooperating to define a reservoir for liquid such as water, the reservoir having a lower portion 47 and an upper portion 48. The base section 41 further defines an open topped mixing and dispensing bowl 49, the upper base section 40 defining an opening 50 at the front portion of the base and above the bowl 49 and a passage 51 extending radially inwardly from the opening 50 to the central portion of the base section 40. The opening 50 is normally closed by a perforated cover or the like 52 that is releasably held in place by a spring latch or the like 53, and that is provided with a handle 54 to facilitate removal and replacement. The dry food storage container 38 comprises a cylindrical wall 55, an annular bottom wall 56, and a horizontally disposed annular partition 57 in overlying spaced parallel relation to the bottom wall 56, the bottom wall 56 and partition 57 being rigidly secured to the cylindrical wall 55 by suitable means, not shown. The bottom wall 56 is provided at its central portion with an axially extending tubular bearing 58 which journals the bottom portion of an axial vent tube 59 that extends upwardly through a central opening 60 in the partition wall 57 and which terminates at its upper end shortly above the level of the upper end of the cylindrical wall 55. The upper end of the food container 38 is closed by an annular cover or lid 61 provided with a dome member 62, having a perforated plate 63 at its central portion for communication with the vent tube 59. As shown in FIG. 8, the vent tube 59 communicates with the mixing bowl 49 through the passage 51, there being a conventional germicidal lamp 64 disposed in the passage 51.

The bottom wall 56 is notched to provide an opening 65 which overlies the radially outer portion of the passage 51 and the bowl 49, the partition member or wall 57 being formed to provide an opening 66 from the annular storage chamber 67 defined by the cylindrical wall 55 and the vent tube 59, the discharge opening 66 being diametrically opposed to the opening 65 in the bottom wall 56. A rotary transfer device 68 is fixed to the lower end of the vent tube 59 for common rotation therewith between the bottom wall 56 and partition wall 57, the transfer device 68 being formed to provide a plurality of circumferentially spaced segmental notches 69 that are adapted to move alternately into registration with the openings 65 and 66, receiving dry food from the storage chamber 67 through the opening 66 and delivering the food to the bowl 49 through the opening 65 in the bottom wall 56.

Rotary movement is imparted to the transfer device 68 and vent tube 59 to cause predetermined quantities of dry food to be delivered to the bowl 49, by an electric motor 70 mounted in the motor chamber 46 by a mounting plate or the like 71, a pinion 72 mounted on the drive shaft of the motor 70, a cooperating gear 73 mounted on a shaft 74 that is journalled in bearings 75 and 76 mounted in the base section 40 and mounting plate 71 respectively, a drive coupling 77 having pin and notch connections 78 with the upper end of the shaft 74, the shaft 74 being disposed on the common axis of the container 38 and base 39. The upper end of the coupling 77 is received within and has a pin and notch connection 79 with a tubular sleeve 80 coaxial with the vent tube 59. A plurality of drive and agitator rods 81 extends diametrically through the vent tube 59 and sleeve 80, radially of the annular storage chamber 67, and are suitably locked in place.

Liquid, such as water, is supplied to the reservoir 47, 48 from a suitable source of water under pressure, not shown, through a supply pipe or line 82 that is connected by suitable fittings to a conventional solenoid operated valve 83 disposed within the motor chamber 46, and a conduit 84 leading from the valve 83 and communicating with the lower reservoir portion 47 through the bottom wall 41a of the intermediate base section 41, by means of a conventional water type fitting 85. A second conduit 86 is connected by suitable fittings 87 and 88 to the top of the upper reservoir portion 48 and upper portion of the bowl 49 respectively. Water in the reservoir is heated to a predetermined temperature by a conventional generally U-shaped electrical heating element 89 having an intermediate portion 90 disposed in the upper reservoir portion 48 and laterally spaced leg portions 91 disposed in the lower reservoir portion 47, the opposite ends of the heating element 89 extending upwardly through the wall portion 41a and mounted therein by means of conventional water type fittings 92, for connection to a source of electrical potential, not shown. The heating element 89 is controlled by a conventional thermostat 93 that is mounted in the bottom wall 41a and which extends downwardly into the lower reservoir portion 47, the thermostat 93 being diagrammatically shown in FIG. 10, and the upper end thereof shown in FIG. 7. As shown in FIG. 8, the upper base section 40 is provided with a breather opening in which is mounted a conventional louver or the like 94 for maintaining atmospheric pressure within the motor chamber 46 during possible changes in temperature therein. The bottom wall of the lower reservoir 47 is provided with a drain plug 95 and a safety opening 96 that is closed by a conventional expansion plug or disk 97.

An agitator rotor 98 is disposed in the bowl 49 adjacent the bottom thereof and is mounted fast on the upper end of the drive shaft 99 of an electric motor 100 enclosed in a pair of housing elements 101 and 102 that are bolted or otherwise rigidly secured to the bottom of the intermediate base section 41. See FIG. 9. The drive shaft 99 is journaled in a bearing 103 mounted in the intermediate base section 41 at the bottom of the bowl 49, and is provided with a sealing member in the nature of a conventional O-ring 104. The housing element 102 cooperates with the base section 41 to provide a drainage chamber 105 having a drain opening 106 whereby any liquid which might leak through the O-ring 104 may drain outwardly from the chamber 105. The drain opening 106 is provided with a screen 107 to prevent foreign matter from entering the chamber 105 fom the exterior. Further, the housing element 102 is provided with a second sealing ring 108 that encompasses the drive shaft 99 to prevent liquid in the chamber 105 from leaking downwardly into the motor 100. Energization of the motor 100 causes the agitator rotor 98 to thoroughly mix the dry food and water introduced to the bowl 49.

Means for delivering mixed liquid food from the bowl 49 to the feed trough 2 includes a pump 109 and conduit means including a cap 110, a fitting 111 secured to the cap 110, an elongated flexible tube 112 having one end secured to the fitting 111 and extending downwardly to the feed trough 2 a rigid pipe 113 secured to the lower end of the tube 112 and extending longitudinally within the hollow vertical wall 9 and a discharge elbow 114 adapted to discharge the liquid food downwardly into the central portion of the feed trough. The pump 109 includes a housing member 115 embedded in the intermediate base section 41 at the bottom of the bowl 49, and an impeller 116 within the housing 115. The impeller 116 is mounted on a vertically disposed shaft 117 of an electrically operated motor 118 that is enclosed within a pair of motor housing members 119 and 120 bolted or otherwise rigidly secured to the bottom of the intermediate base section 41, see particularly FIG. 8. A pair of sealing rings 121 are suitably mounted in the base section 41 and motor housing member 120 to prevent leakage of liquid to the motor 118. The pump housing is formed to provide a plurality of inlet openings 122, the base section 41 having therein an outlet opening 123 from the interior of the pump housing 115 and which leads to a discharge passage 124 defined by the cap 110 and the adjacent portion of the intermediate base portion 41. The passage 124 extends vertically to the upper end portion of the bowl 49 where the same communicates with the fitting 111 generally above the normal high level of liquid in the bowl 49. This arrangement prevents liquid from escaping from the bowl 49 until the pump 109 is operated to cause substantially positive delivery of the liquid food from the bowl 49 to the feed trough 2.

The level of liquid food in the feed trough 2 and automatic operation of the feeding apparatus is controlled by electrical control means including a depth control electrode or probe element 125 and a pair of relatively short and relatively long electrodes or probe elements 126 and 127 respectively. The electrode 125 is mounted on the barrier wall 8 of the feed trough 2 by a mounting bracket 128 and extends downwardly thereof toward the bottom of the feed trough terminating at the desired level of liquid food therein. As shown in FIG. 10, the electrode 125 is grounded to the feed trough 2. The electrodes or probe elements 126 and 127 depend from a common head 129 into the bowl 49, the head 129 being suitably mounted on the upper base section 40 within the passage 51, see FIG. 8. The probe lements 126 and 127 are adapted to be grounded to the base 39 by liquid in the bowl 49, the electrode or probe element 126 being interposed in a circuit comprising a relay coil 130 and the secondary winding of a transformer 131, said secondary winding also being grounded, see FIG. 10. The primary winding of the transformer 131 is interposed in a circuit comprising a conventional grounded plug 132 that is adapted to be connected to a source of electrical potential, not shown, and a manually operated controller 133. The controller 133 comprises a plurality of connected double throw switches, the first thereof including stationary contacts 134 and 135 and a movable contact 136, the second thereof including stationary contact 137 and 138 and a movable contact 139, and the third thereof comprising stationary contacts 140 and 141 and a movable contact 142. The stationary contact 134 and 137 are connected by a circuit including a normally open switch 143, and the stationary contacts 134 and 140 are adapted to be connected by a circuit including a second normally open switch 144. The electrodes or probe elements 125 and 127 provide holding circuits for the relay coil 130 through a holding switch 145, the relay coil 130 being operatively connected to a switch comprising stationary contacts 146 and 147 and a movable contact 148. The relay coil 130, transformer 131, switch 145 and the switch comprising the contacts 146, 147 and 148 are contained in a casing 149 within the motor chamber 46.

A timing motor 150 is suitably mounted within the motor chamber 46, and drives a plurality of switch-operating cams 151, 152, 153 and 154 that are mounted on the output shaft 155 of the motor 150, the shaft 155 extending outwardly through the adjacent wall of the base section 41 and having an adjustment knob 156 mounted on the outer end thereof. The motor 150 is connected to a mounting plate 157 which carries a plurality of switches each of which is operatively associated with a different one of the cams 151–154. One of these cam-operated switches comprises a pair of stationary contacts 158 and 159 and a movable contact 160, the second thereof including a pair of stationary contacts 161 and 162 and a movable contact 163, a third comprising a pair of stationary contacts 164 and 165 and a movable contact 166, and a fourth thereof being a single throw switch indicated at 167. Another control switch 168 involves a pair of stationary contacts 169 and 170 and a movable contact 171, the switch 168 being operated by a cam 172 on the output shaft of the motor 70. As shown in FIG. 10, the germicidal lamp 64 is provided with the usual ballast 173, and an indicator lamp 174, connected in series with a resistor 175, is mounted in the generally cylindrical wall of the upper base section 40 to indicate that the feeding apparatus is in an operative condition.

Operation of the above-described apparatus is as follows, assuming that the feed trough 2 and bowl 49 are empty, that the plug 132 is coupled to a source of electrical potential, and that the switch 133 is in a switch-open condition, as shown in FIG. 10. In this condition of the apparatus, the control switches are positioned with contacts 147 and 148 being closed, contacts 158 and 160 being closed, contacts 162 and 163 being closed, contacts 165 and 166 being closed, switch 167 being open, and contacts 169 and 171 being closed. Upon manipulation of the switch 133 to close contacts 135 and 136, contacts 138 and 139, and contacts 141 and 142, a circuit is immediately established through the heating element 89 and its controlling thermostat 93, and the timing motor 150 is energized through closed contacts 135 and 136, contacts 147 and 148, contacts 165 and 166 and contacts 158 and 160. During this initial operation of the timing motor 150, the dispenser motor 70 is energized through contacts 170 and 171, contacts 147 and 148, and contacts 135 and 136. The dispenser motor 70 operates only momentarily, to cause its movable contact 171 to disengage contact 170 and engage 169 whereupon the dispenser motor 70 will become deenergized. Further, during this interval, the agitator motor 100 is energized through a circuit involving contacts 135 and 136, contacts 147 and 148, contacts 165 and 166, and contacts 162 and 163. As the timer motor 150 continues to operate, switch 167 is closed thereby to energize the solenoid operated valve 83 to admit water under pressure to the reservoir portions 47 and 48 and mixing bowl 49. Simultaneously with the closing of switch 167, the movable contact 160 is moved by its respective one of the cams 151–154 out of engagement with the contact 158 and into engagement with the contact 159, deenergizing the timing motor 150.

It will be noted that the above-described manipulation of the switch 133 causes a circuit to be completed through the primary winding of the transformer 131 to energize the same. When water delivered to the bowl 49 through the valve 83, conduit 84, reservoir portions 47 and 48 and conduit 86, reaches the level of the electrode 126, a circuit is completed through the secondary winding of the transformer 131 and relay coil 130 to cause the switch 145 to be closed and the movable contact 148 to move into engagement with the contact 146, whereby to deenergize the solenoid valve 83 to shut off the water supply. The switch 145 is a holding switch for the relay coil 130 to maintain the same energized as long as either one of the electrodes 125 and 127 make contact with liquid in the feed trough 2 and bowl 49 respectively. Engagement of the contact 146 and 148 causes the timing motor 150 to be re-energized, the circuits therefor including switch contacts 135 and 136, switch contacts 146 and 148, and switch contacts 159 and 160. As the timer motor operates, switch contacts 169 and 171 are closed completing a circuit for the timer motor which circuit also includes switch contacts 135 and 136 and switch contacts 146 and 148. When the dispenser motor 70 has operated for a sufficient time to cause delivery of a charge of dry food to the bowl 49, operation of the dispenser motor 70 causes the movable contact 171 of switch 168 to move out of engagement with the contact 169 and into engagement with the contact 170, deenergizing the dispenser motor 70. In the meantime, the switch contact 166 moves out of engagement with the contact 165 and into engagement with the contact 164 to cause continued energization of the agitator motor 100 through switch contacts 162 and 163.

After a predetermined time interval, the movable switch contact 163 is moved out of engagement with the contact 162 and into engagement with the contact 161, deenergizing the agitator motor 100 and energizing the pumping motor 118, the circuit of the pumping motor 118 including switch contacts 141 and 142, contacts 161 and 163, and contacts 164 and 166. The motor 118 continues to operate to empty the bowl 49 of liquid during which time the timer motor 150 operates to move the contact 166 out of engagement with the contact 164 and into engagement with the contact 165. This completes one cycle of automatic operation of the apparatus.

Upon completion of the cycle, should the level of liquid food in the feed trough 2 be lower than the electrode or probe element 125 so that no contact is made therewith, the holding circuit for the relay coil 130 through the probe element 127 will be broken by the pumping of liquid food from the bowl 49 and a subsequent cycle of operation be immediately initiated. However, when the level of liquid food reaches the electrode 125 during operation of the pump motor 118, the motor 118 and pump 109 will continue to operate to empty the bowl 49 after which the motor 118 and timing motor will be deenergized by opening of the contacts 161 and 163 and contacts 164 and 166. A new cycle of operation will not be initiated until the relay coil 130 is subsequently deenergized by consumption of liquid food from the feed trough, to close contacts 147 and 148.

When it is desired to clean the feed trough 2 and mixer and dispenser 3, the switch 133 is manipulated to close contacts 134 and 136, 137 and 139, and 140 and 142. The feed trough 2 is then swung upwardly and outwardly to its dotted line position of FIG. 3 and the removable end wall removed to permit drainage of the liquid food therefrom into a pail or other suitable receptacle, not shown. Thereafter, the end wall 7 may be replaced and the feed trough 2 moved back to its operative position, shown by full lines in FIG. 3. The food container 38 and cover plate 52 are then removed from the mixer and dispenser 3, to expose the bowl 49 and passage 51, after which the switch 143 is closed to energize the solenoid of the valve 83, causing the bowl 49 to be supplied with water. This water may be used to clean the bowl 49 and electrode elements 126 and 127 of food particles which may have accumulated thereon, after which the switch 144 is closed to energize the delivery pump motor 118, causing the water in the bowl 49 to be pumped to the feed trough 2. When the water has been delivered to the feed trough, the guards 31 may be raised to permit the operator to use a brush or swab to clean the interior of the trough, after which the same is raised to its dotted line position and drained. Water for rinsing the bowl, flexible tube 112 and feed trough 2 is obtained in the manner just above described. It will be noted that, with the switch 133 in its last-described position, all of the circuits to the dispenser motor 70, agitator motor 100, timing motor 150 and heater 89, are deactivated.

While I have shown and described a commercial embodiment of my automatic liquid food mixer and animal feeder, it will be understood that the same is capable of modification without departure from the spirit and scope of the invention, as defined in the claims.

What I claim is:
1. An animal liquid feeder comprising:
  (a) an elongated generally horizontal base structure adapted to rest upon the ground within an enclosure having a wall provided with an opening at its lower portion, with the longitudinal dimension of said base structure disposed generally normal to said wall,
  (b) said base structure including a generally vertically disposed generally rectangular open mounting frame at one end thereof adapted to be anchored to said enclosure wall about said opening,
  (c) an elongated generally horizontal feed trough disposed in overlying generally parallel relation to said base structure,
  (d) linkage mounting said feed trough on said base structure for angularly upward and downward movements relative to the base structure and generally longitudinally thereof between a lowered feeding position and a raised cleaning position,
  (e) one end portion of said feed trough extending through said open frame and having a vertically extended transverse barrier disposed adjacent said frame when said feed trough is in its lowered feeding position,
  (f) liquid food dispensing means remote from said feed trough for dispensing predetermined quantities of liquid food,
  (g) conduit means extending from said dispensing means to said feed trough,
  (h) and control means for said dispensing means including a control element in said feed trough outwardly of said barrier and responsive to consumption of liquid food from said feed trough to a predetermined level to render said dispensing means operative to dispense a predetermined quantity of liquid food to said feed trough.

2. The structure defined in claim 1 in which said feed trough includes bottom wall structure defining a chamber extending for the greater portion of the length of said feed trough, and in further combination with an elongated heating element in said chamber and yieldingly urged into engagement with surface portions of said bottom wall structure.

3. An animal liquid feeder comprising:
  (a) an elongated generally horizontal base structure,
  (b) an elongated feed trough disposed in overlying generally parallel relation to said base and having a bottom wall, spaced sidewalls, and front and rear end walls, said front end wall being removable,
  (c) means releasably locking said front end wall in sealing engagement with said bottom and side walls,
  (d) linkage mounting said feed trough on said base for angularly upward and downward and generally longitudinal movements between an operative feeding position wherein said feed trough rests on said base and a raised longitudinally displaced inoperative cleaning position wherein said feed trough is longitudinally tilted downwardly in the direction of said removable front end wall,
  (e) liquid food dispensing means remote from said feed trough for dispensing predetermined quantities of liquid food,
  (f) conduit means extending from said dispensing means to said feed trough,
  (g) and control means for said dispensing means including a control element in said feed trough and responsive to consumption of liquid food from the trough to a predetermined level to render said dispensing means operative to dispense a predetermined quantity of liquid food to said feed trough.

4. The animal liquid feeder defined in claim 3 in which said linkage comprises a pair of relatively long rigid links pivotally connected at their opposite ends to said base and the feed trough adjacent said rear end wall, and a pair of relatively shorter rigid links pivotally connected at their opposite ends to said base and feed trough forwardly of said relatively longer links, said links moving between said feed trough operative position extending generally longitudinally of said feed trough and generally upright feed trough supporting positions.

5. The animal feeder defined in claim 3 in which said feed trough includes an elongated generally vertical wall overlying the open top of said feed trough and extending longitudinally thereof intermediate said side walls, characterized by a pair of elongated guards each overlying said feed trough at an opposite side of said vertical wall and extending longitudinally of said feed trough, said guards having inner longitudinal side edges disposed adjacent said generally vertical wall and outer longitudinal side edges engaging adjacent ones of said feed trough side walls, said guards normally sloping upwardly from their adjacent side walls toward said generally vertical wall and each defining longitudinally spaced feeding openings, and guard mounting means mounting each of said guards at its inner side edge to said generally vertical wall for swinging movements on a generally horizontal axis extending longitudinally of said feed trough and toward and away from its normal position.

6. The animal feeder defined in claim 5 in which each of said guards comprises a generally horizontal shaft extending longitudinally of said feed trough and a plurality of longitudinally spaced parallel bars secured to and extending transversely of said shaft, said guard mounting means comprising hinge elements operatively connected to their respective shafts and to said generally vertical wall.

7. The structure defined in claim 3 in which said control means includes a second control element in said dispensing means operative responsive to delivery of a predetermined quantity of liquid to said bowl to actuate said valve operating mecahnism to close said valve.

8. The structure defined in claim 3 in which said liquid dispensing means further includes dry food dispensing and mixing mechanism comprising:
  (a) a storage container for dry pulverulent animal food,
  (b) delivery means for delivering measured quantities of dry food from said container to said bowl,
  (c) and means for mixing said dry food and liquid in said bowl,
  (d) said first-mentioned control element being responsive to said consumption of liquid food from the trough to open said valve, actuate said dry food delivery means and mixing means, and cause delivery of the mixed liquid food to the feed trough.

9. The structure defined in claim 7 in which said control means includes a third control element in said dispensing means cooperating with said first-mentioned control element to initiate repeated cycles of operation of said dispensing means until sufficient liquid food is delivered to said feed trough to raise the level thereof above said predetermined level.

References Cited by the Examiner

UNITED STATES PATENTS

| | | | |
|---|---|---|---|
| 2,570,694 | 10/1951 | Langenbahn | 119—73 X |
| 2,576,154 | 11/1951 | Trautvetter | 119—72 |
| 2,636,475 | 4/1953 | Moyer | 119—61 |
| 2,642,837 | 6/1953 | Schroeder | 119—52 |
| 2,660,981 | 12/1953 | Jorenby | 119—61 |
| 2,821,370 | 1/1958 | Varner | 119—51 X |
| 3,037,481 | 6/1962 | Kloss | 119—71 |
| 3,092,077 | 6/1963 | Smoker et al. | 119—52 |
| 3,169,510 | 2/1965 | Fulton | 119—73 |

SAMUEL KOREN, *Primary Examiner.*

A. F. MEDBERY, *Assistant Examiner.*